United States Patent
Bayter et al.

(10) Patent No.: US 10,491,540 B2
(45) Date of Patent: Nov. 26, 2019

(54) METHOD OF AND SYSTEM FOR MANAGING A FEDERATION OF CLOUD COMPUTING RESOURCES

(71) Applicant: ORMUCO INC., Montreal, QC (CA)

(72) Inventors: Orlando Bayter, Montreal (CA); Olivier Pilotte, Montreal (CA); Simon Poirier, Montreal (CA)

(73) Assignee: Ormuco Inc., Montreal (CA)

( * ) Notice: Subject to any disclaimer, the term of this patent is extended or adjusted under 35 U.S.C. 154(b) by 67 days.

(21) Appl. No.: 15/153,946

(22) Filed: May 13, 2016

(65) Prior Publication Data

US 2016/0337262 A1    Nov. 17, 2016

Related U.S. Application Data

(60) Provisional application No. 62/162,758, filed on May 17, 2015.

(51) Int. Cl.
  *G06F 11/34* (2006.01)
  *H04L 12/24* (2006.01)
  (Continued)

(52) U.S. Cl.
  CPC .............. *H04L 47/82* (2013.01); *G06F 11/00* (2013.01); *G06F 11/34* (2013.01);
  (Continued)

(58) Field of Classification Search
  None
  See application file for complete search history.

(56) References Cited

U.S. PATENT DOCUMENTS

| | | | |
|---|---|---|---|
| 10,031,774 B2 * | 7/2018 | Chen | G06F 9/4881 |
| 2010/0131948 A1 | 5/2010 | Ferris | |

(Continued)

FOREIGN PATENT DOCUMENTS

WO    2014074407 A1    5/2014

OTHER PUBLICATIONS

Kattau, Suzanne, "A new type of uber-cloud provider will arise, says Equinix, 2015 Tech Predictions", Jan. 1, 2015, retrieved on Internet on Jul. 17, 2015.

(Continued)

*Primary Examiner* — Joshua Joo
(74) *Attorney, Agent, or Firm* — Nexus Law Group LLP; Nicholas P. Toth

(57) ABSTRACT

Technologies are provided for managing a federation of resources using modules hosted at a cloud federation management system. In some variants an identity provider module establishes a connection between a first cloud management system associated with a first cloud computing resource and an electronic device associated with a user. The identity provider module may also establish a connection between a second cloud management system associated with a second cloud computing resource and the electronic device associated with the user. A collector module may access first and second data buses respectively hosted at the first and second cloud management systems. The data set gathered by the collector module may then be used to generate cloud federation usage data indicative of a usage of the federation of resources.

20 Claims, 8 Drawing Sheets

(51) Int. Cl.
H04L 12/911 (2013.01)
G06F 11/00 (2006.01)
H04L 12/14 (2006.01)

(52) U.S. Cl.
CPC ...... *H04L 12/1435* (2013.01); *H04L 12/1439* (2013.01); *H04L 41/5096* (2013.01)

(56) References Cited

U.S. PATENT DOCUMENTS

| | | | | |
|---|---|---|---|---|
| 2011/0167469 A1* | 7/2011 | Letca | ................ | G06F 21/6218 726/1 |
| 2013/0060839 A1* | 3/2013 | Van Biljon | ............ | G06Q 30/04 709/203 |
| 2013/0160105 A1* | 6/2013 | Huang | ................ | H04L 63/0815 726/8 |
| 2013/0185413 A1* | 7/2013 | Beaty | .................... | G06F 9/5072 709/224 |
| 2013/0246208 A1* | 9/2013 | Jain | .......................... | G06F 9/50 705/26.3 |
| 2013/0262556 A1* | 10/2013 | Xu | ....................... | G06F 9/5027 709/202 |
| 2013/0263209 A1* | 10/2013 | Panuganty | .............. | H04L 43/04 726/1 |
| 2015/0199208 A1* | 7/2015 | Huang | ................ | G06F 9/45533 718/1 |
| 2015/0228003 A1* | 8/2015 | Iyoob | ................. | G06Q 30/0631 705/26.64 |
| 2015/0319068 A1* | 11/2015 | Ferris | .................. | G06F 11/3409 709/224 |
| 2015/0347221 A1* | 12/2015 | Anderson | ............... | H04L 47/70 714/4.1 |
| 2016/0043909 A1* | 2/2016 | Pogrebinsky | .... | G06Q 10/06312 705/40 |
| 2016/0277312 A1* | 9/2016 | Ferris | .................... | G06F 9/5072 |
| 2016/0321572 A9* | 11/2016 | Martinez | ................ | G06Q 10/06 |
| 2017/0070580 A1* | 3/2017 | Cardona-Gonzalez | ..................... | H04L 67/141 |

OTHER PUBLICATIONS

Gentzsch, Wolfgang et al., "Uber-Cloud Experiment Provides Insight into Computing-as-a-Service", Dec. 6, 2012, retrieved on Internet on Jul. 17, 2015.

* cited by examiner

METHOD OF AND SYSTEM FOR MANAGING A FEDERATION OF CLOUD COMPUTING RESOURCES

CROSS-REFERENCE TO RELATED APPLICATION

This United States Non-Provisional application claims priority from U.S. Provisional Application Ser. No. 62/162,758, filed on May 17, 2015, the entire content of which is incorporated herein by reference.

FIELD

The present technology relates to systems and methods for managing a federation of cloud computing resources. In particular, the method and system allow establishing a connection between a cloud computing resource which is part of the federation of cloud computing resources and a user. The method and system also allow generating cloud federation usage data indicative of a usage of the federation of cloud computing resources by the user.

BACKGROUND

Cloud-based computing architectures have opened new possibilities for rapid deployment of on-line services. Typically, a cloud-based architecture deploys a set of hosted resources such as processors, operating systems, software, routers and other components that may be combined together to form one or more virtual machines. A user may instantiate one or more virtual machines on the hosted resources from a cloud management system to conduct specific tasks or applications. As an example, a user may want to set up a web site by instantiating a virtual web server from the cloud management system. As another example, in addition to the web site, the user may want to set up an email server in which case she/he may do so by instantiating a virtual email server from the cloud management system. Amongst many benefits, the cloud-based architecture allows flexibility by instantiating virtual machines on as-needed basis, either for a long-term period or a short-term period, without having to carry the burden of installing, maintaining and/or operating physical servers and/or other hardware equipment.

In a cloud computing environment, cloud computing resources are typically provided through dedicated servers associated with an entity, such as, for example, Amazon™, through its service Amazon Elastic Compute Cloud™ (Amazon EC2™). In addition to providing control to virtual machines instantiated on dedicated and/or proprietary servers of the entity, such service may allow scaling capacity, both up and down. Even though flexible, such service relies on dedicated servers associated with the entity (e.g., Amazon) which results in the user being limited to host her/his virtual machines on the entity's dedicated servers and may not select hosting her/his virtual machines on cloud computing resources independent from the entity and/or at least not directly controlled and/or owned by the entity.

Under some approaches, such as the one detailed in U.S. Patent Publication 2010/0131948, more flexibility is allowed by providing a cloud environment on-demand. Such approach allows creating cloud computing environment, on-demand, from non-dedicated cloud controlled resources or third-party resources. Even though such approach includes a cloud management system configured to communicate with non-dedicated resources and/or third-party controlled resources, improvements may still be desirable, in particular, improvements aiming at, amongst other things, (i) managing establishment of a connection between a cloud computing resource of the federation of cloud computing resources and a user and/or (ii) generating cloud federation usage data indicative of a usage of multiple cloud computing resources of the federation of cloud computing resources by the user.

SUMMARY

The present technology arises from multiple observations made by the inventor(s), including, but without being limited thereto, that (i) a collector module may be hosted at a cloud federation management system to access one or more data buses hosted at one or more cloud management systems hosted by multiple cloud computing resources of the federation of cloud computing resources; and/or (ii) an identity provider module may be hosted at the cloud federation management system to establish a connection between a user and one or more cloud management systems hosted by cloud computing resources of the federation of cloud computing resources. As a result of the implementation of the collector module and/or the identity provider, cloud federation usage data indicative of a usage of the federation of cloud computing resources by the user may be generated and connection establishment between the cloud computing resources and the user may be facilitated.

The present technology thereby results in a more efficient management of a federation of cloud computing resources while providing a desirable flexibility to the user. Such flexibility may result in allowing the user to select one or more cloud computing resources from the federation of cloud computing resources on an as-needed/as-requested basis while accurately monitoring the actual usage of the cloud computing resources. In some embodiments, monitoring the actual usage of the cloud computing resources to generate cloud federation usage data may be used to monetize usage of each one of the cloud computing resources on an as-used/as-requested basis.

Thus, in one aspect, various implementations of the present technology provide a computer-implemented method of managing a federation of cloud computing resources, the method comprising causing an identity provider module hosted at a cloud federation management system to establish a first connection between a first cloud management system associated with a first cloud computing resource and an electronic device associated with a user; accessing, by a collector module hosted at the cloud federation management system, a first data bus hosted at the first cloud management system, the first data bus being configured so as to monitor an execution of a first computing process by the first cloud computing resource based on a first request originating from the electronic device; causing the identity provider module hosted at the cloud federation management system to establish a second connection between a second cloud management system associated with a second cloud computing resource and the electronic device; accessing, by the collector module hosted at the cloud federation management system, a second data bus hosted at the second cloud management system, the second data bus being configured so as to monitor an execution of a second computing process by the second cloud computing resource based on a second request originating from the electronic device associated with the user; and compiling a first set of data gathered by the collector module from the first data bus and a second set of data gathered by the collector module from the second data bus to generate cloud federation usage data indicative of a usage of the federation of cloud computing resources by the user.

In another aspect, the cloud federation usage data is indicative of at least one of a quantity of storage, an amount of processor usage, a time period, a data volume, a usage of on operating system and a usage of a software.

In yet another aspect, the first computing process and the second computing process relate to at least one of an application and a virtual machine.

In another aspect, the first computing process and the second computing process relate to at least one of an Infrastructure as a service (IaaS), a Platform as a Service (PaaS) and a Software as a service (SaaS).

In yet another aspect, the first cloud management system is associated with a first cloud service provider and the second cloud management system is associated with a second cloud service provider.

In another aspect, the identity provider module and the collector module are hosted by a backend system of the cloud federation management system, the backend system being distinct from a frontend system hosting a portal server allowing the user to interact with the cloud federation management system.

In yet another aspect, prior to causing the identity provider module hosted at the cloud federation management system to establish the first connection, the method executes:

receiving, by the cloud federation management system, a request transmitted by a cloud service reseller associated with the user.

In some other aspects, various implementations of the present technology provide a computer-implemented method of managing a federation of cloud computing resources, the method comprising: causing an electronic device associated with a user to display a list of cloud computing resources, the cloud computing resources comprising at least a first cloud computing resource associated with a first entity and a second cloud computing resource associated with a second entity; upon receiving an indication of a selected cloud computing resource selected from the list of cloud computing resources by the user, causing an identity provider module hosted at a cloud federation management system to establish a connection between a cloud management system associated with the selected cloud computing resource and the electronic device; accessing, by a collector module hosted at the cloud federation management system, a data bus hosted at the cloud management system, the data bus being configured so as to monitor an execution of a computing process by the selected cloud computing resource based on a request originating from the user; upon determination, by the collector module, that the execution of the computing process by the selected cloud computing resource based on the request originating from the user has occurred, storing, in a cloud event database, usage data associated with the computer process executed based on the request originating from the user; and accessing the cloud event database to generate compiled usage data for the user, the compiled usage data being generated at least based on the usage data.

In some other aspects, various implementations of the present technology provide a computer-implemented method of managing a federation of cloud computing resources, the method comprising: receiving, at a cloud federation management system, a request transmitted by a cloud service reseller associated with a user; and causing an identity provider module hosted at a cloud federation management system to establish a connection between a cloud management system associated with a cloud computing resource and an electronic device associated with the user.

In some other aspects, various implementations of the present technology provide a computer-implemented method of managing a federation of cloud computing resources, the method comprising receiving, at a cloud federation management system, a request transmitted by a cloud service reseller associated with a user; causing an identity provider module hosted at a cloud federation management system to establish a connection between a cloud management system associated with a cloud computing resource and an electronic device associated with the user; accessing, by a collector module hosted at the cloud federation management system, a data bus hosted at the cloud management system, the data bus being configured so as to monitor an execution of a computing process by the selected cloud computing resource based on a request originating from the user; upon determination, by the collector module, that the execution of the computing process by the selected cloud computing resource based on the request originating from the user has occurred, storing, in a cloud event database, usage data associated with the computer process executed based on the request originating from the user; accessing the cloud event database to generate compiled usage data for the user, the compiled usage data being generated at least based on the usage data; and transmitting, to the cloud service reseller, the compiled usage data for the user.

In some other aspects, various implementations of the present technology provide a computer-implemented method of generating an hybrid virtual cloud based on a federation of cloud computing resources, the method comprising: receiving, by an electronic device, a request to provide a computer process execution platform defining the hybrid virtual cloud; causing an identity provider module hosted at a cloud federation management system to (i) establish a first connection between a first cloud management system associated with a first cloud computing resource and the electronic device; (2) establish a second connection between a second cloud management system associated with a second cloud computing resource and the electronic device; and establishing the computer process execution platform based on the first connection and the second connection.

In some other aspects, various implementations of the present technology provide a computer-implemented method of generating an hybrid virtual cloud based on a federation of cloud computing resources, the method comprising receiving, by an electronic device, a request to provide a computer process execution platform defining the hybrid virtual cloud; causing an identity provider module hosted at a cloud federation management system to (i) establish a first connection between a first cloud management system associated with a first cloud computing resource and the electronic device; (ii) establish a second connection between a second cloud management system associated with a second cloud computing resource and the electronic device; establishing the computer process execution platform based on the first connection and the second connection; accessing, by a collector module hosted at the cloud federation management system, a first data bus hosted at the first cloud management system, the first data bus being configured so as to monitor an execution of a computing process by the first cloud computing resource based on the request, the computing process being partially executed by the first cloud computing resource and partially executed by the second cloud computing resource; accessing, by the collector module hosted at the cloud federation management system, a second data bus hosted at the second cloud management system, the second data bus being configured so as to monitor an execution of the computing process by the second cloud computing resource based on the request; and compiling a first set of data gathered by the collector module from the first data bus and a second set of data gathered by the collector module from the second data bus to generate cloud federation usage data indicative of a usage of the federation of cloud computing resources by the user.

In other aspects, various implementations of the present technology provide a non-transitory computer-readable medium storing program instructions for managing a federation of cloud computing resources, the program instructions being executable by a processor of a computer-based system to carry out one or more of the above-recited methods.

In other aspects, various implementations of the present technology provide a computer-based system, such as, for example, but without being limitative, an electronic device and/or a server comprising at least one processor and a memory storing program instructions for managing a federation of cloud computing resources, the program instructions being executable by one or more processors of the computer-based system to carry out one or more of the above-recited methods.

In the context of the present specification, unless expressly provided otherwise, an "electronic device", a "server", a "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
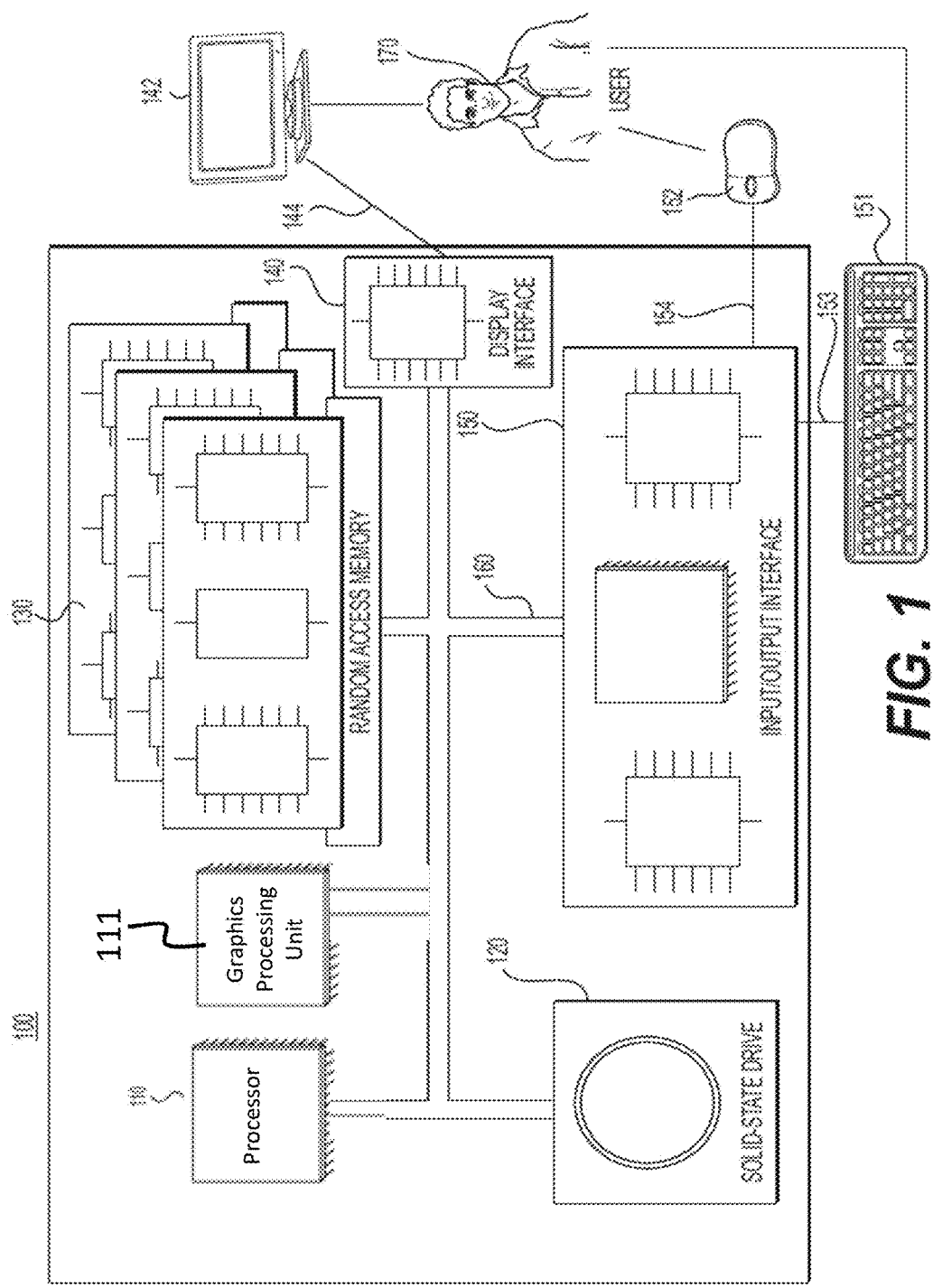
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a graphics processing unit (GPU) 111, a solid-state drive 120, a random access memory 130, a display interface 140, and/or an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a touchscreen (not shown), a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 and/or the GPU 111 for processing activity indications associated with a user 170. For example, the program instructions may be part of a library or an application.

Figure 2:
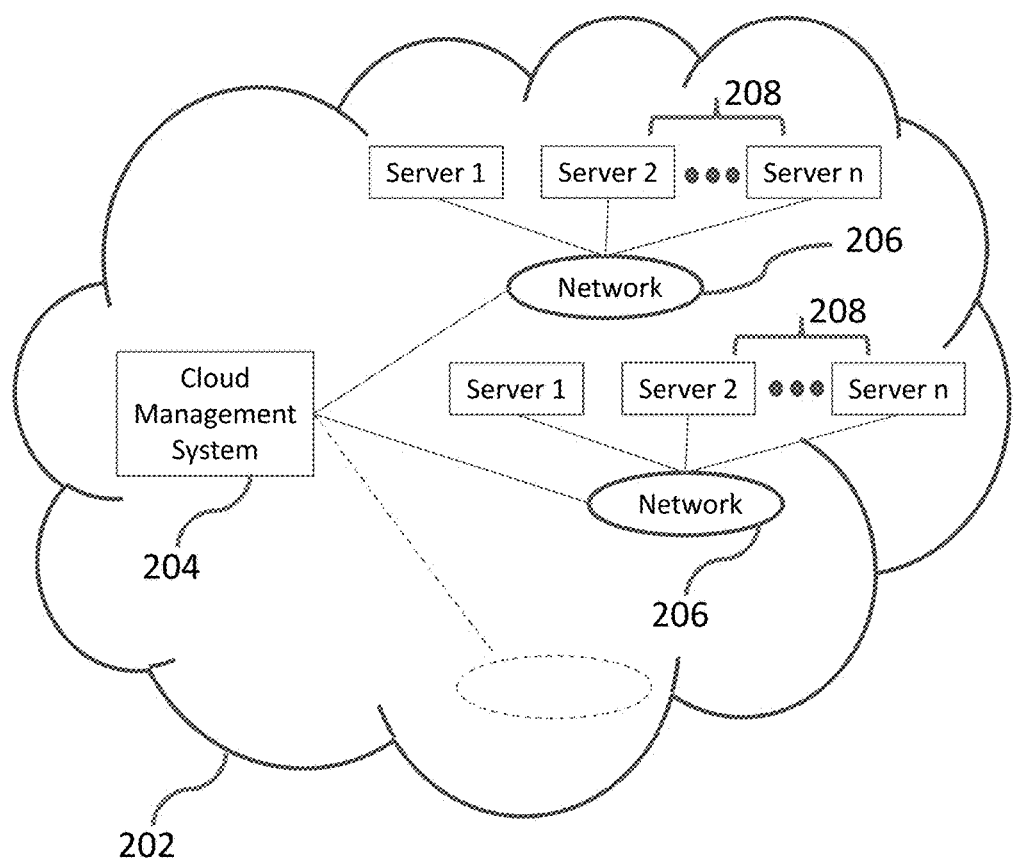
FIG. 2 is a diagram of a cloud computing resource in accordance with an embodiment of the present technology.

In FIG. 2, there is shown a cloud computing resource 202 associated with an entity. The entity may be a legal entity owning the cloud computing resource and/or controlling, directly or indirectly, the cloud computing resource 202. Examples of entities will be further discussed below in connection with FIG. 3. The cloud computing resource 202 illustrates an environment in which a virtual machine may operate and in which a computing process may be instantiated. The cloud computing resource 202 may also be referred to as a "cloud". The cloud computing resource 202 may comprise a collection of resources that can be invoked to instantiate a virtual machine and/or a computer process (e.g., an emulated infrastructure, an operating system and/or a software platform) for a limited or defined duration. As illustrated in FIG. 2, the collection of resources supporting the cloud computing resource 200 may comprise one or more servers 208 configured to operate computing components needed to instantiate the virtual machine, the computer process and/or other resources. In some embodiments, each one of the one or more servers 208 may be implemented as a conventional computer server and may comprise some or all of the features of the computer system 100 depicted at FIG. 1. In an example of an embodiment of the present technology, at least some of the one or more servers 208 can be implemented as a Dell™ PowerEdge™ Server running the Microsoft™ Windows Server™ operating system. Needless to say, the one or more servers 208 can be implemented in any other suitable hardware and/or software and/or firmware or a combination thereof. In the depicted non-limiting embodiment of present technology, each one of the one or more servers 208 is a single server. In alternative non-limiting embodiments of the present technology, the functionality of each one of the one or more servers 208 may be distributed and may be implemented via multiple servers. Other variations are also possible and may become apparent to a person skilled in the art of the present technology.

The implementation of each one of the one or more servers 208 is well known to the person skilled in the art of the present technology. However, briefly speaking, each one of the one or more servers 208 comprises a communication interface (not depicted) structured and configured to communicate with various entities via a network 206. In some non-limiting embodiments of the present technology, the network 206 can be implemented as the Internet. In other embodiments of the present technology, the network 206 may be implemented differently, such as any wide-area communications network, local-area communications network, a private communications network and the like. Each one of the one or more servers 208 further comprises at least one computer processor (e.g., a processor 110) operationally connected with the communication interface and structured and configured to execute various processes to be described herein.

In an example, a first group of one or more servers 208 may host and serve an operating system and/or components thereof to instantiate a virtual machine. Still under this example, a second group of one or more servers 208 may host and serve processor time and/or computing cycles to provide processing power (i.e., statically or dynamically adjusted) for the virtual machine. Still under this example, a third group of one or more servers 208 may host and serve storage volume to provide storage capacity (i.e., statically or dynamically adjusted) for the virtual machine. The storage capacity may take the form of a short-term memory (e.g. random access memory (RAM) storage) and/or long-term memory (e.g., non-volatile storage such as hard drive storage). Still under this example, a fourth group of one or more servers 208 may host and serve an application which may be executed by the virtual machine, such as, but without being limitative, a web server, an email server, a content server, a file server, etc. Even though reference is made to a virtual machine and a computing process, it should be understood that both may be merged together in such a way that one may include the other. As a first example, a virtual machine may comprise one or more computing processes. As a second example, a computer process may include one or more virtual machines. As a third example, a virtual machine may be a computer process and vice-versa. For the sake of clarity with respect to the following description, reference will be made to a computer process even though the computer process may implement one or more virtual machines. Under some embodiments, the computer process and/or a combination of computer processes may also be instantiated to offer an Infrastructure as a service (IaaS), a Platform as a Service (PaaS) and/or a Software as a service (SaaS). Other variations and/or combinations may be also feasible and may become apparent to a person skilled in the art of the present technology.

As illustrated in FIG. 2, the collection of resources supporting the cloud computing resource 202 may also comprise a cloud management system 204. The cloud management system 204 may be hosted on a dedicated server and/or one of the one or more servers 208. For embodiments wherein the cloud management system 204 is hosted on a dedicated server, the dedicated server may be similar to one of the one or more servers 208. Other variations may also be envisioned without departing from the scope of the present technology. In some embodiments such as the one depicted in FIG. 2, the cloud management system 204 may be connected to the one or more servers 208 via the network 206. In some embodiments, such as the one depicted at FIG. 3, the cloud management 204 may comprise a data bus. Further details regarding exemplary embodiments of the data bus will be provided in connection with the description of FIG. 3. In some embodiments, the cloud management system 204 may deploy an IaaS solution so as to initiate and execute a computing process (which may itself include initiation of an IaaS solution). In some embodiments, the IaaS solution may be OpenStack™ which may be deployed so as to control pools of processing, storage, and networking resources throughout a data center.

In some embodiments, the cloud management system 204 may receive a request from a user 170 to instantiate a computing process on the cloud computing resource 202. The request, once received by the cloud management system 204, may result in the cloud management system 204 identifying a collection of resources required for the execution of the computing process. In some embodiments, the cloud management system 204 may identify one or more servers 208 and may ensure that each one of the one or more servers 208 allocates the required resources to perform the requested computing process. In some embodiments, the cloud management system 204 may oversee the execution of the computing process, for example, but without being limited thereto, by ensuring proper instantiation of the computing process (e.g., instantiation of a required virtual machine and/or execution of a required application).

Figure 3:
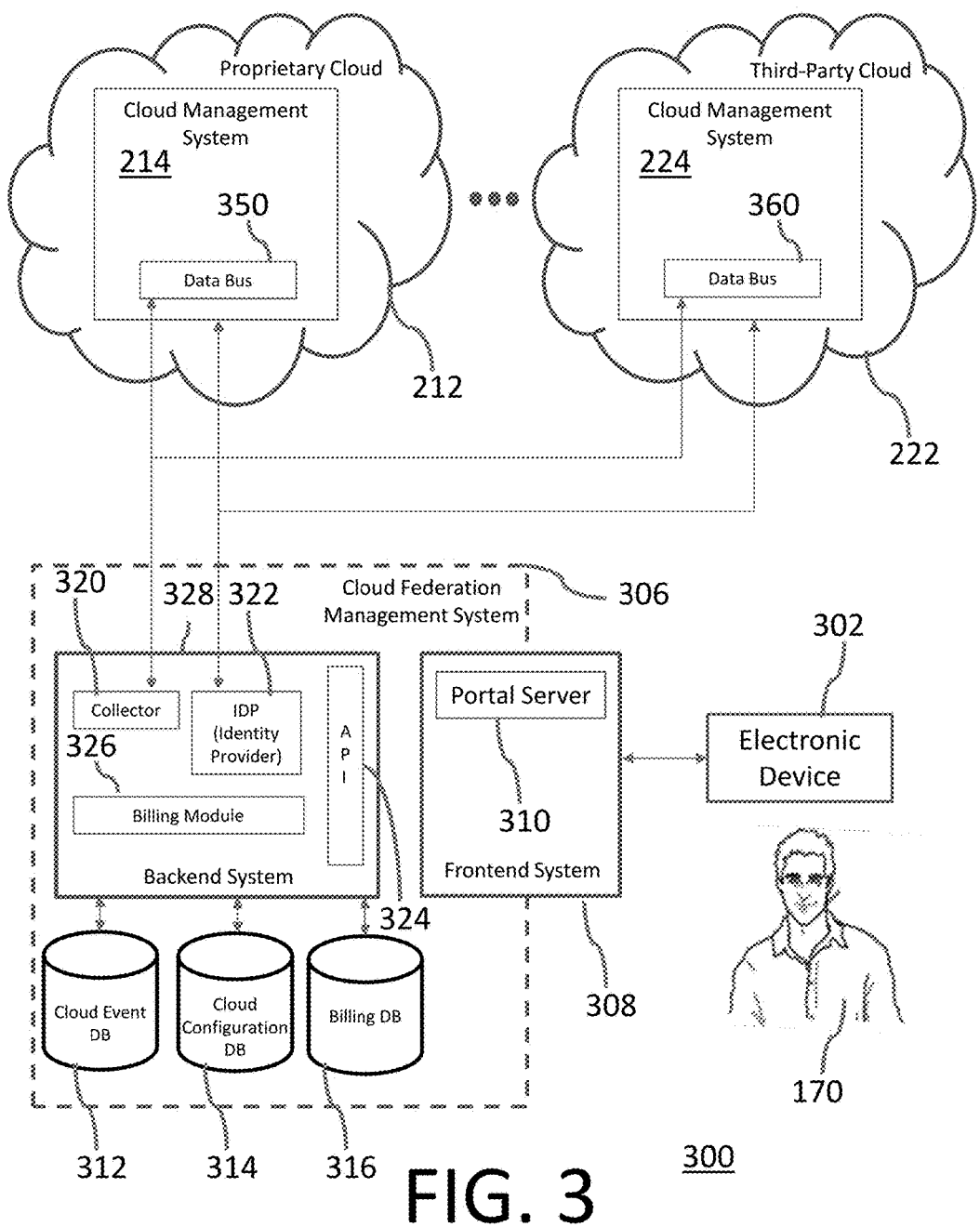
FIG. 3 is a diagram illustrating a federation of cloud computing resources in accordance with an embodiment of the present technology.

In some embodiments, the request to instantiate a computing process may be received directly from an electronic device associated with the user 170 (e.g., an electronic device 302 as depicted in FIG. 3). In some other embodiments, the request may be received from another cloud management system associated with a different cloud computing resource and/or entity than the cloud computing resource 202. In yet some other embodiments, the request may be received from a cloud federation management system such as a cloud federation management system 306 as depicted in FIG. 3. Other variations may also be envisioned and may become apparent to a person skilled in the art of the present technology.

In some embodiments, the request may include one or more parameters which may be taken into consideration upon instantiating the computing process. As an example, but without being limitative, such one or more parameters may be reflective of an IaaS, a PaaS and/or a SaaS configuration. Such one or more parameters may be indicative of a configuration required to instantiate a particular computing process, such as, but without being limitative, an amount of RAM, an amount of processing power and/or an amount of storage. Such one or more parameters may also be a time indication as too how long and/or when the computing process should be instantiated. In some other embodiments, the one or more parameters may also be reflective of multiple computing processes to be instantiated in series and/or in parallel by the cloud computing resource 202. In yet some other embodiments, the one or more parameters may also be indicative of a service level agreement acceptable for a particular application to be instantiated by the cloud computing resource 202. Multiple variations and/or combinations of parameters and/or parameter types may be envisioned without departing from the scope of the present technology and may become apparent to the person skilled in the art of the present technology.

Upon instantiating the computing process, the cloud computing resource 202 and/or the cloud management system 204 may locate required components and/or resources necessary to properly execute the computing process. In some embodiments, the required components and/or resources may be accessed within the cloud computing resource 202 (e.g., hosted on the one or more servers 208) and/or from outside of the cloud computing resource 202 (e.g., another cloud computing resource 202, a third-party application provider, an external storage, etc). During instantiation of the computing process, the cloud management system 204 may also dynamically manage the required components and/or resources needed. As an example, the cloud management system 204 may arrange to secure an amount of processing power allocated for a first phase of an execution of the computing process, then, during a second phase of the execution of the computing process, the cloud management system 204 may reduce the amount of processing power allocated while, at a same time, increasing an amount of storage to store data generated during the first phase and/or increase a bandwidth of a communication interface to transmit the data generated during the first phase. In some embodiments, once the computing process has been executed and can be stopped, the cloud management system 204 may de-allocate the required components and/or resources so that the required components and/or resources may become available for instantiation of another computing process. As a person skilled in the art of the present technology, the examples described above are provided for illustrative purposes and are not limitative. Multiple variations and/or combinations may be envisioned without departing from the scope of the present technology and may become apparent to the person skilled in the art of the present technology.

Turning now to FIG. 3, a diagram illustrating a federation of cloud computing resources 300 in accordance with an embodiment of the present technology is depicted. In this embodiment, the federation of cloud computing resources 300 comprises a cloud federation management system 306 connected via a network (not shown) to a cloud computing resource 212 and to a cloud computing resource 222. In some embodiments, the network may be similar to the network 206 illustrated in FIG. 2. The cloud federation system 306 may also be connected to an electronic device 302. In some embodiments, the cloud computing resource 212 may be similar to the cloud computing resource 202 depicted in FIG. 2, and may include a cloud management system 214 which may itself be similar to the cloud management system 204. In some embodiments, the cloud computing resource 212 may be owned and/or controlled by a same entity than the cloud federation management system 306 thereby defining a "Proprietary Cloud". In some instances, having the cloud computing resource 212 being owned and/or controlled by a same entity than the cloud federation management system 306 may result in a higher trust level than a third-party cloud computing resource (e.g., the cloud computing resource 222) and may thereby result in lesser security control requirements and/or in a cloud computing resource better suited to handle more sensitive information. In some embodiments, access to the cloud computing resource 212 may be restricted to users associated with the entity that owns and/or controls the cloud computing resource 212.

In some embodiments, the cloud management system 214 may include a data bus 350. In some embodiments, the data bus 350 may be configured to monitor an execution of a computing process (e.g., instantiation of a computing process and/or a virtual machine) by the cloud computing resource 212. For embodiments wherein OpenStack™ is deployed throughout the cloud computing resource 212, the data bus 350 may be embodied as a data center monitoring the execution of the computing process. An example of data accessible via the data bus 350 is exemplified at FIG. 4 and is described in the paragraphs below.

In some embodiments, the cloud computing resource 222 may be similar to the cloud computing resource 202 depicted in FIG. 2 and/or the cloud computing resource 212, and may include a cloud management system 224 which itself may be similar to the cloud management system 204 and/or the cloud management system 214. In some embodiments, the cloud computing resource 222 may be associated with an entity defined as a "Third-Party Cloud". As an example, the cloud computing resource 222 may be owned and/or controlled by a different entity than the cloud federation management system 306 and/or the cloud computing resource 212. As a person skilled in the art of the present technology may appreciate, the cloud federation management system 306 may be designed as such that a cloud federation of cloud computing resources may comprise proprietary cloud computing resource(s) (e.g., the cloud computing resource 212) and/or third-party cloud computing resource(s) (e.g., the cloud computing resource 222).

The cloud federation management system 306 may comprise a backend system 328 and a frontend system 308. In some embodiments, the backend system 328 and the frontend system 308 defines a same entity and/or are hosted on a same server and/or a same cluster of servers. The server and/or the cluster of servers may be similar or dissimilar to the servers 208. The backend system 328 may comprise a collector module 320, an Identity Provider (IDP) module 322, an Application Programming Interface (API) module 324 and a billing module 326. As a person skilled in the art of the present technology may appreciate, the backend system 328 may comprise some but not all of the above-listed modules. The backend system 328 may also comprise other modules not illustrated in FIG. 3. The collector module 320 may be configured to access the data bus 350 and/or the data bus 360 so as to access data representative of an execution of a computing process on the cloud computing resource 212 and/or on the cloud computing resource 222. In some embodiments, the collector module 320 may access the data bus 350 and 360 through a secured connection and/or a non-secured connection, via a network connecting the cloud federation management system 306 to the cloud computing resource 212 and/or the cloud computing resource 222. In some embodiments, the collector 320 is configured to "listen" to the data bus 350 and the data bus 360 so as to "collect" data indicative of the execution of the computing process. In embodiments wherein the connector is connected to both the cloud computing resource 212 and the cloud computing resource 222, the collector module 320 may listen to both the data bus 350 and the data bus 360 on a continuous basis thereby allowing collection of data relating to multiple computing processes executed on both the cloud computing resource 212 and the cloud computing resource 222 by a same user. The collected data may then be compiled so as to consolidate all data associated with a same user thereby allowing generating data representative of an overall usage of the federation of cloud computing resources 300 by a particular user, irrespectively of where the computing processes have been executed (e.g., on the cloud computing resource 212 and/or the cloud computing resource 222). Other variations and/or combinations may also be envisioned without departing from the scope of the present technology. An example of data exchange between the data bus 350 and the collector 320 is detailed in connection with the description of FIG. 4.

Turning now to the IDP module 322, the IDP module 322 may be configured so as to establish a connection between a user 170 (via the electronic device 302) and the cloud computing resource 212 and/or the cloud computing resource 222. In some embodiments, the IDP module 322 may be configured so as to establish a direct connection between the user 170 and the cloud computing resource 212 and/or the cloud computing resource 222 without requiring a communication channel to be established and/or maintained between the electronic device 302 and the cloud federation management system 306. In some embodiments, because of the configuration of the collector 320 and the IDP module 322 allowing direct connection between the user 170 and the cloud computing resource 212 and/or the cloud computing resource 222, data relating to an execution of one or more computing processes may be tracked even though the cloud federation management system 306 does not act as an intermediary between the electronic device 302 and the cloud computing resource 212 and/or the cloud computing resource 222. As a result, the cloud federation management system 306 may accurately track usage of the cloud computing resource 212 and/or the cloud computing resource 222 without having to monitor data traffic between the user 170 and the cloud computing resource 212 and/or the cloud computing resource 222 resulting from an execution of a computing process requested by the user 170. In some other embodiments, the IDP module 322 may be configured so as to establish a partially direct or an indirect connection between the user 170 and the cloud computing resource 212 and/or the cloud computing resource 222. In such embodiments, the cloud federation management system 306 may act as an intermediary between the electronic device 302 and the cloud computing resource 212 and/or the cloud computing resource 222 and may, partially or completely, monitor the data traffic between the user 170 and the cloud computing resource 212 and/or the cloud computing resource 222 resulting from an execution of a computing process requested by the user 170. In some embodiments, the IDP module 322 may also include security and/or identification routines to control access to the federation of cloud computing resources 300. Such routines may include creation, modification and deletion of user accounts and/or information associated with user accounts. In some embodiments, the IDP module 322 may also connect to other resources internal and/or external to the cloud federation management system 306. In some embodiments, such other resources may include a user account database (not shown) containing data relating to users of the federation of cloud computing resources 300. Other variations and/or combinations of components associated with the IDP module 322 may also be envisioned without departing from the scope of the present technology and may become apparent to a person skilled in the art of the present technology. An example of data exchange resulting from a connection initiated by the user 170 via the IDP module 322 is detailed in connection with the description of FIG. 5.

The API module 324 may be included in the backend system 328 to facilitate interactions between the backend system 328 and other modules of the cloud federation management system 306 such as, for example, but without being limitative, the frontend system 308. In some embodiments, the API module 324 may facilitate access to databases such as a cloud event database 312, a cloud configuration database 314 and/or a billing database 316. Implementations details of the API module 324 are not included for the purpose of clarity but many implementations may be envisioned as it may become apparent to a person skilled in the art of the present technology.

The billing module 326 may also be included in the backend system 328 to allow monetization of services provided by the federation of cloud computing resources 300. In some embodiments, the billing module 326 may access the cloud event database 312 populated by the collector module 320 to generate billing information associated with one or more users. In such embodiments, the billing module 326 may compile data collected by the collector module 320 for a particular user. The compiled data may then be stored in the billing database 316 for future usage. Other data may also be stored in the billing database 316 as it may be appreciated by a person skilled in the art of the present technology.

As previously mentioned, the backend system 328 may also include or be connected to the cloud event database 312, the cloud configuration database 314 and the billing information 316. In some embodiments, the cloud event database 312 may store data collected by the collector module 320 and/or additional data resulting from events that have occurred within the federation of cloud computing resources 300, such as, for example, but without being limitative, execution of computing processes by users. Other data may also be stored in the cloud event database 312 as it may be appreciated by a person skilled in the art of the present technology.

The cloud configuration database 314 may store data relating to the configuration of the cloud computing resource 212 and/or the cloud computing resource 222. In some embodiments, the cloud configuration database 314 may contain information relating to the configuration of the cloud computing resource 212 and the cloud computing resource 222. The cloud configuration database 314 may also contain information relating to the configuration of the federation of cloud computing resources 300 so as to allow, for example, a computing process to be executed by both the cloud computing resource 212 and/or the cloud computing resource 222. Other data may also be stored in the cloud configuration database 314 as it may be appreciated by a person skilled in the art of the present technology.

As previously mentioned, the cloud federation management system 306 may also include the frontend system 308. In some embodiments, the frontend system 308 may include a portal server 310 which allows a web browser and/or an application running on the electronic device 302 to interact with the cloud federation management system 306. In some embodiments, the portal server 310 may provide a list of features associated with the cloud computing resource 212 and the cloud computing resource 222. The list of features may be presented to the user 170 on the electronic device 302 so that she/he may select a cloud computing resource on which the computing process is to be executed. Multiple variations are also possible and may be envisioned by a person skilled in the art of the present technology.

The implementation of the electronic device 302 is not particularly limited, but as an example, the electronic device 302 may interact with the portal server 310 by receiving input from the user 170 and receiving and transmitting data via a network. The electronic device 302 may be, for example and without being limitative, a desktop computer, a laptop computer, a smart phone (e.g. an Apple iPhone™ or a Samsung Galaxy SS™), a personal digital assistant (PDA) or any other device including computing functionality and data communication capabilities. The electronic device 302 may comprise internal hardware components including one or more single or multi-core processors collectively referred to herein as processor 110, a GPU 111 and a random access memory 130, each of which may be analogous to the like-numbered hardware components of computer system 100 shown in FIG. 1, as well as a network interface (not depicted) for communicating with the portal server 310.

Figure 4:
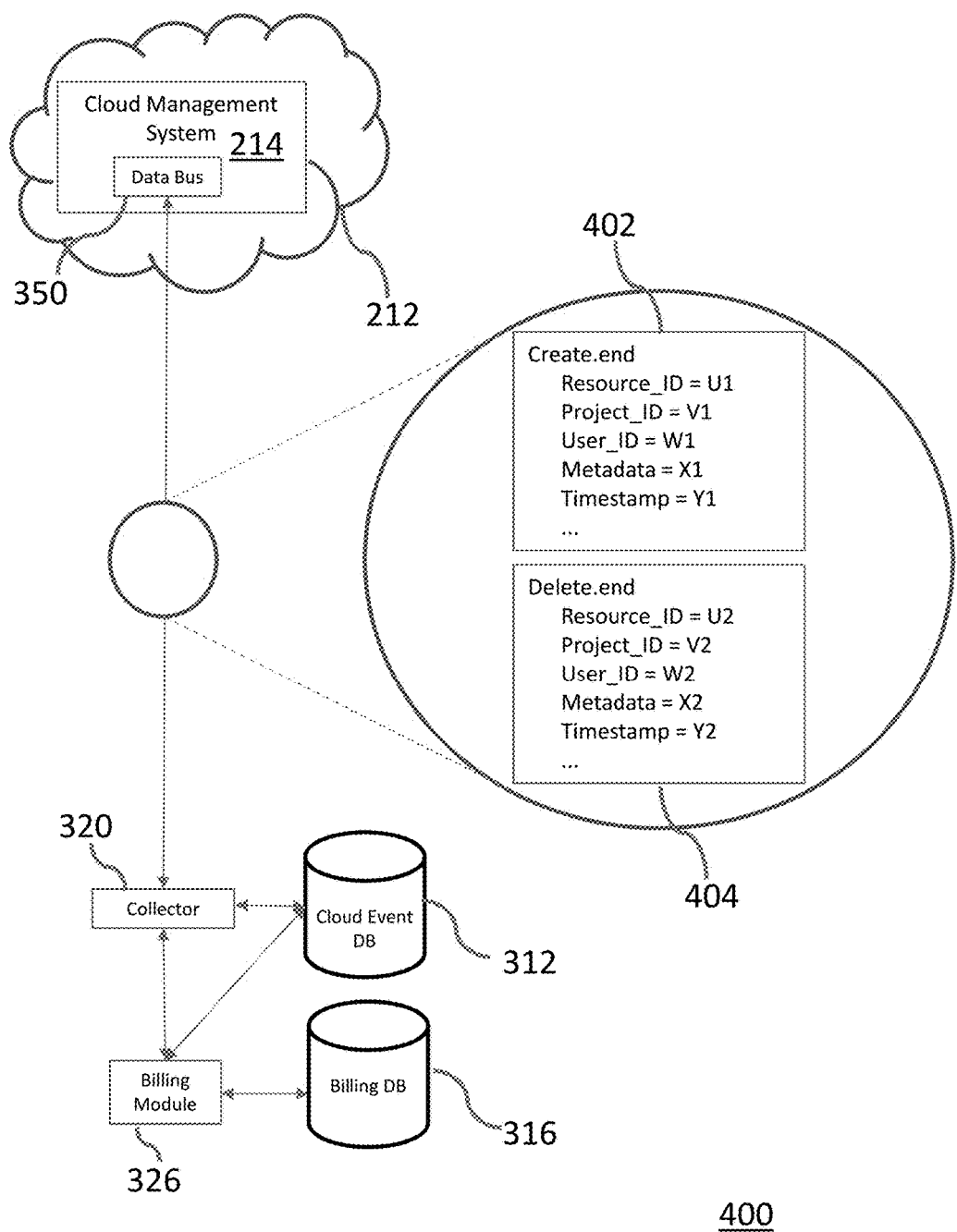
FIG. 4 is a diagram illustrating a data exchange between a data bus of a cloud computing resource and a collector module of a cloud federation management system in accordance with an embodiment of the present technology.

Turning now to FIG. 4, a data exchange between the data bus 350 and the collector module 320 is detailed. More specifically a first set of data 402 and a second set of data 404 are illustrated. The first set of data 402 may be associated with a beginning of an execution of a computing process further to the receipt of a request from a user. The first set of data 402 may be associated with a data package entitle "Create.end" representative of an action associated with the first set of data 402. The first set of data 402 may also include a set of fields such as a "Resource_ID", a "Project_ID", a "User_ID", a "Metadata" and a "Timestamp". The first set of data may also include additional fields not illustrated in FIG. 4. As a person skilled in the art of the present technology may appreciate, the fields may allow identifying a cloud computing resource and/or a resource within the cloud computing resource (e.g. a specific server). The fields may also allow identifying a particular project associated with the execution of the computing process along with an identifier of a user also associated with the execution of the computing process. In addition, the fields may include metadata and a timestamp. In an embodiment, the timestamp may be later used by the billing module 326 to allow identification of a duration of a usage of a cloud computing resource. The second set of data 404 may be associated with another data package entitle "Delete.end" representative of an action with the second set of data 404. The second set of data 404 may be associated with an end of an execution of a computing process further to the receipt of a request from a user. The second set of data 404 may include a set of fields similar to the set of fields of the first set of data 402.

In some embodiments, once received by the collector module 320, the first set of data 402 and the second set of data 404 may be stored in the cloud event database 312 for later use. In some embodiments, the collector may process the first set of data 402 and the second set of data 404 to generate compiled and/or augmented data (for example, by associating the first set of data 402 and the second set of data 404 with data previously stored in the cloud event database 312 and/or the billing database 316). In a similar fashion, the first set of data 402 and the second set of data 404 may be accessed by the billing module 326 from the cloud event database 312, processed and then stored in the billing database 316. It should be understood that the example of FIG. 4 is provided to exemplify data collected by the collector module 320 from the data bus 350 and should not be construed as being limitative. Multiple variations may become apparent to a person skilled in the art of the present technology.

Figure 5:
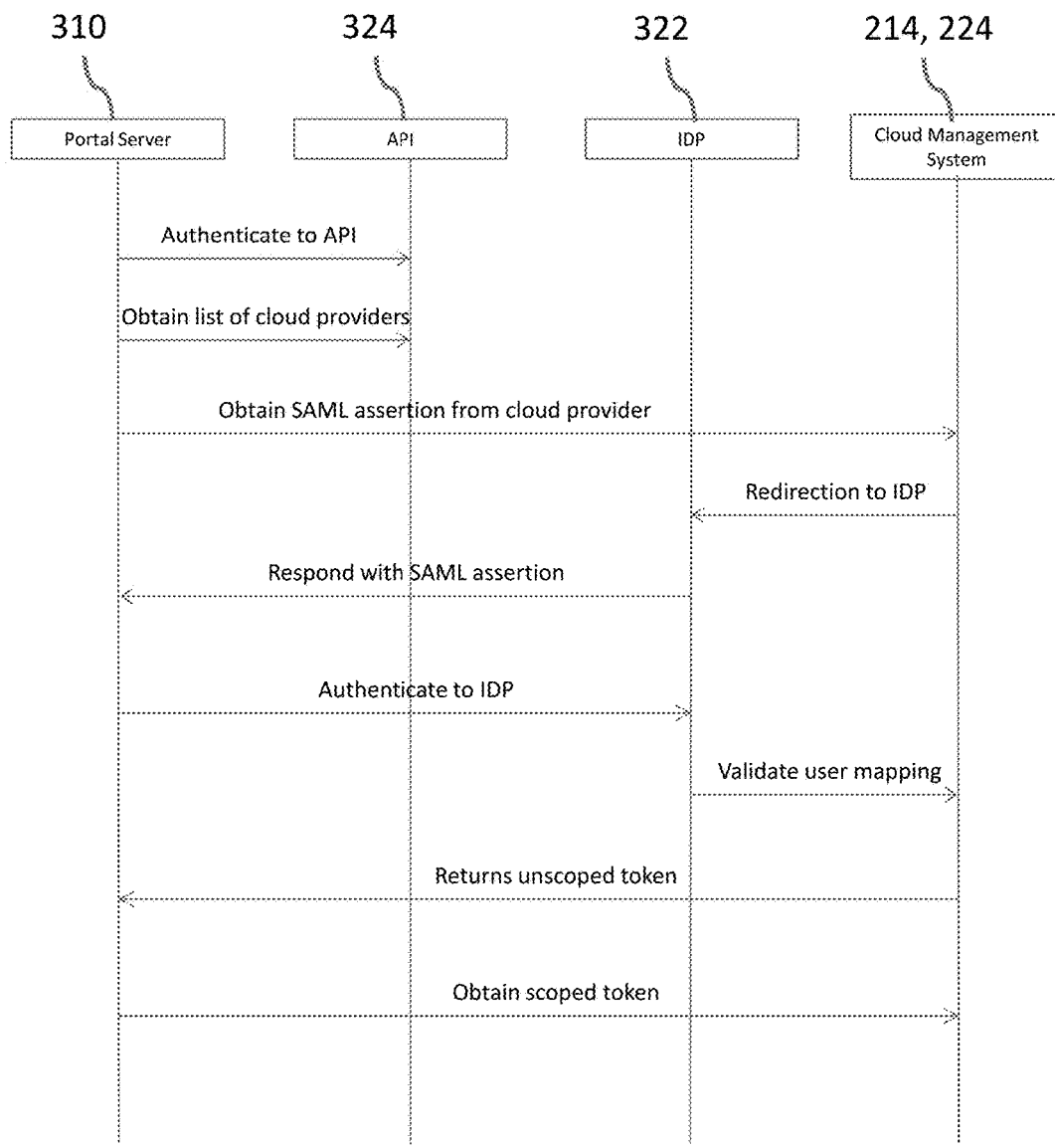
FIG. 5 is a diagram illustrating a sequence of exchanges establishing a connection between a user and a cloud management system in accordance with another embodiment of the present technology.

Turning now to FIG. 5, a diagram illustrating a sequence of exchanges establishing a connection between a user and a cloud management system is depicted. More particularly the diagram illustrates an embodiment of interactions between the portal server 130, the API module 324, the IDP module 322 and the cloud management system 214 and/or the cloud management system 224. A request may be received by the portal server 310 from the electronic device 302 which, in turn, sends a request to authenticate to the API module 324. In some embodiments, the portal server 310 may also transmit a request to obtain a list of cloud providers (i.e, a list of cloud computing resources). In some embodiments, the portal server 310 may also send a request to obtain Security Assertion Markup Language (SAML) assertion from a cloud provider (i.e., from one of the cloud computing resources). In some embodiments, the request to obtain SAML assertion from the cloud provider may be sent to the API module 324 and/or the IDP module 322 which, in turn, transmit the request to the cloud management system 214 and/or cloud management system 224. If the request to obtain SAML assertion from the cloud provider is received by the cloud management system 214 and/or the cloud management system 224, it may then be transmitted to the IDP module 322 along with a corresponding SAML assertion. The IDP module 322 may then send the SAML assertion to the portal server 310. The portal server 310 may then authenticate to the IDP module 322. The IDP module 322 may then validate user mapping and return an unscoped token to the portal server 310. The portal server 310 may then obtain a scoped token. As a person skilled in the art of the present technology may appreciate, multiple variations and/or modifications may be made to how the portal server 130, the API module 324, the IDP module 322 and the cloud management system 214 and/or the cloud management system 224 may interact.

Figure 6:
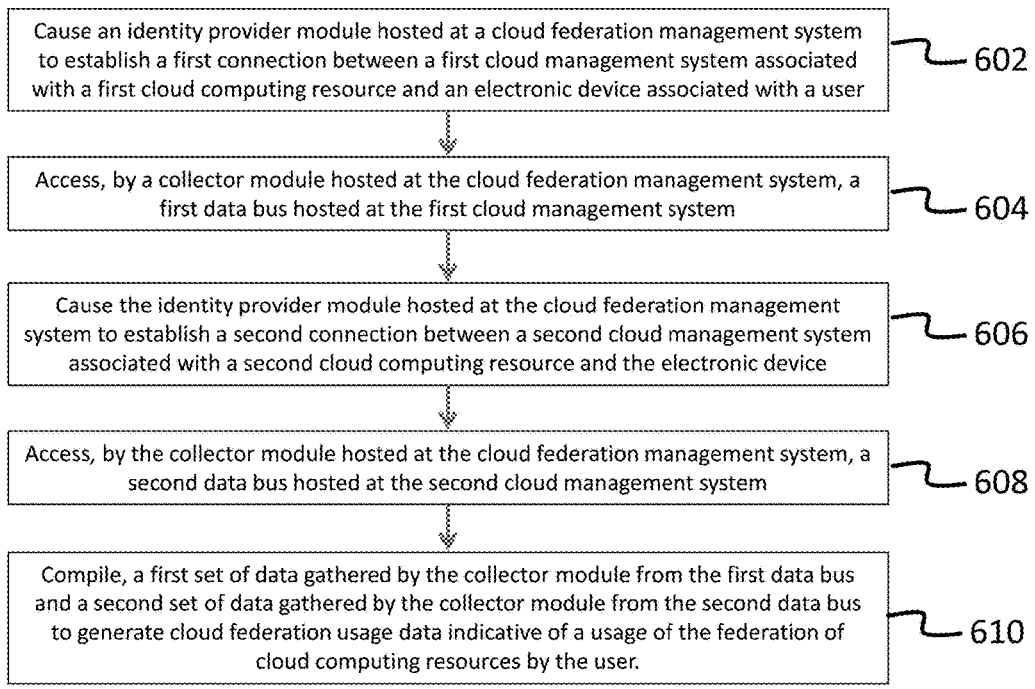
FIG. 6 is a diagram illustrating a flowchart illustrating a computer-implemented method implementing embodiments of the present technology.

Having described, with reference to FIG. 1 to FIG. 5, some non-limiting example instances of systems and computer-implemented methods used in connection with the problem of managing a federation of cloud computing resources, we shall now describe general solutions to the problem with reference to FIG. 6.

More specifically, FIG. 6 shows a flowchart illustrating a computer-implemented method 600 of managing a federation of cloud computing resources.

The computer-implemented method 600 of managing a federation of cloud computing resources starts at step 602 by causing the IDP module 322 hosted at the cloud federation management system 306 to establish a first connection between the cloud management system 214 associated with the cloud computing resource 212 and the electronic device 302 associated with the user 170. In some embodiments, prior to executing the step 602, the method executes causing the electronic device 302 to display a list of cloud computing resources (not shown), the cloud computing resources comprising at least the cloud computing resource 212 and the cloud computing resource 222; and receiving, by the cloud federation management system 306, an indication of at least one of the cloud computing resources selected by the user 170. Prior to executing the step 602, the method may also execute receiving, from the electronic device 302, an indication that the first computing process is to be executed by the federation of cloud computing resources 300; and determining, by the cloud federation management system 306, which one of cloud computing resources is to be selected to execute the first computing process. In some embodiments, the cloud management system 214 is associated with a first cloud service provider and the cloud management system 224 is associated with a second cloud service provider. Prior to executing the step 602, the method may also execute receiving, by the cloud federation management system 214, a request transmitted by a cloud service reseller associated with the user 170.

The method, at step 604, may execute accessing, by the collector module 320 hosted at the cloud federation management system 306, the data bus 350 hosted at the cloud management system 214, the data bus 350 being configured so as to monitor an execution of the first computing process by the cloud computing resource 212 based on a first request originating from the electronic device 302.

The method, at step 606, may execute causing the IDP module 322 hosted at the cloud federation management system 306 to establish a second connection between the cloud management system 224 associated with the cloud computing resource 222 and the electronic device 302. Then, the method may proceed to step 608 by accessing, by the collector module 320 hosted at the cloud federation management system 306, the data bus 360 hosted at the cloud management system 224, the data bus 360 being configured so as to monitor an execution of a second computing process by the cloud computing resource 222 based on a second request originating from the electronic device 302 associated with the user 170.

The method, at a step 608, may execute compiling a first set of data gathered by the collector module 320 from the data bus 350 and a second set of data gathered by the collector module 320 from the data bus 360 to generate cloud federation usage data indicative of a usage of the federation of cloud computing resources by the user 170. In some embodiments, the first set of data gathered by the collector module 320 from the data bus 350 comprises data indicative of a creation of the first computing process and data indicative of a deletion of the first computing process.

In some embodiments, the first set of data gathered by the collector module 320 from the data bus 350 comprises data indicative of a creation of the first computing process and data indicative of a deletion of the first computing process. The data indicative of the creation of the first computing process and the data indicative of the deletion of the first computing process further comprise a time stamp, a resource identifier associated with the first cloud computing resource and a user identifier associated with at least one of the user 170 and the electronic device 302. In some embodiments, the cloud federation usage data is indicative of a usage of the federation of cloud computing resources for a given period of time, the given period of time being associated with at least one of the first computing process and the second computing process.

In some embodiments, the cloud federation usage data is indicative of a usage of the federation of cloud computing resources 300 by each respective one of a plurality of users. In some embodiments, the cloud federation usage data is indicative of at least one of a quantity of storage, an amount of processor usage, a time period, a data volume, a usage of on operating system and a usage of a software.

In some embodiments, the method 600 also comprises the steps of instantiating the first computing process in the cloud computing resource 212; and instantiating the second computing process in the cloud computing resource 222. In some embodiments, the first computing process and the second computing process relate to at least one of an application and a virtual machine. In yet some embodiments, the first computing process and the second computing process relate to at least one of an Infrastructure as a service (IaaS), a Platform as a Service (PaaS) and a Software as a service (SaaS). In yet some embodiments, the IDP module 322 and the collector module 320 are hosted by the backend system 328 of the cloud federation management system 306, the backend system being distinct from the frontend system 308 hosting the portal server 320 allowing the user 170 to interact with the cloud federation management system 306.

In some alternative embodiments, the method 600 may execute an alternative series of steps. Such alternative series of steps may include causing the electronic device 302 associated with the user 170 to display a list of cloud computing resources, the cloud computing resources comprising at least the cloud computing resource 212 associated with the first entity and the cloud computing resource 222 associated with the second entity. The method 600 may also include upon receiving an indication of a selected cloud computing resource selected from the list of cloud computing resources by the user 170, causing the IDP module 322 hosted at the cloud federation management system 306 to establish a connection between a cloud management system associated with the selected cloud computing resource and the electronic device 302. The method 600 may also include accessing, by the collector module 320 hosted at the cloud federation management system 306, the data bus 350 hosted at the cloud management system 214, the data bus 350 being configured so as to monitor an execution of a computing process by the selected cloud computing resource based on a request originating from the user 170. Upon determination, by the collector module 320, that the execution of the computing process by the selected cloud computing resource based on the request originating from the user has occurred, storing, in the cloud event database 312, usage data associated with the computer process executed based on the request originating from the user 170; and accessing the cloud event database 312 to generate compiled usage data for the user 170, the compiled usage data being generated at least based on the usage data.

Figure 7:
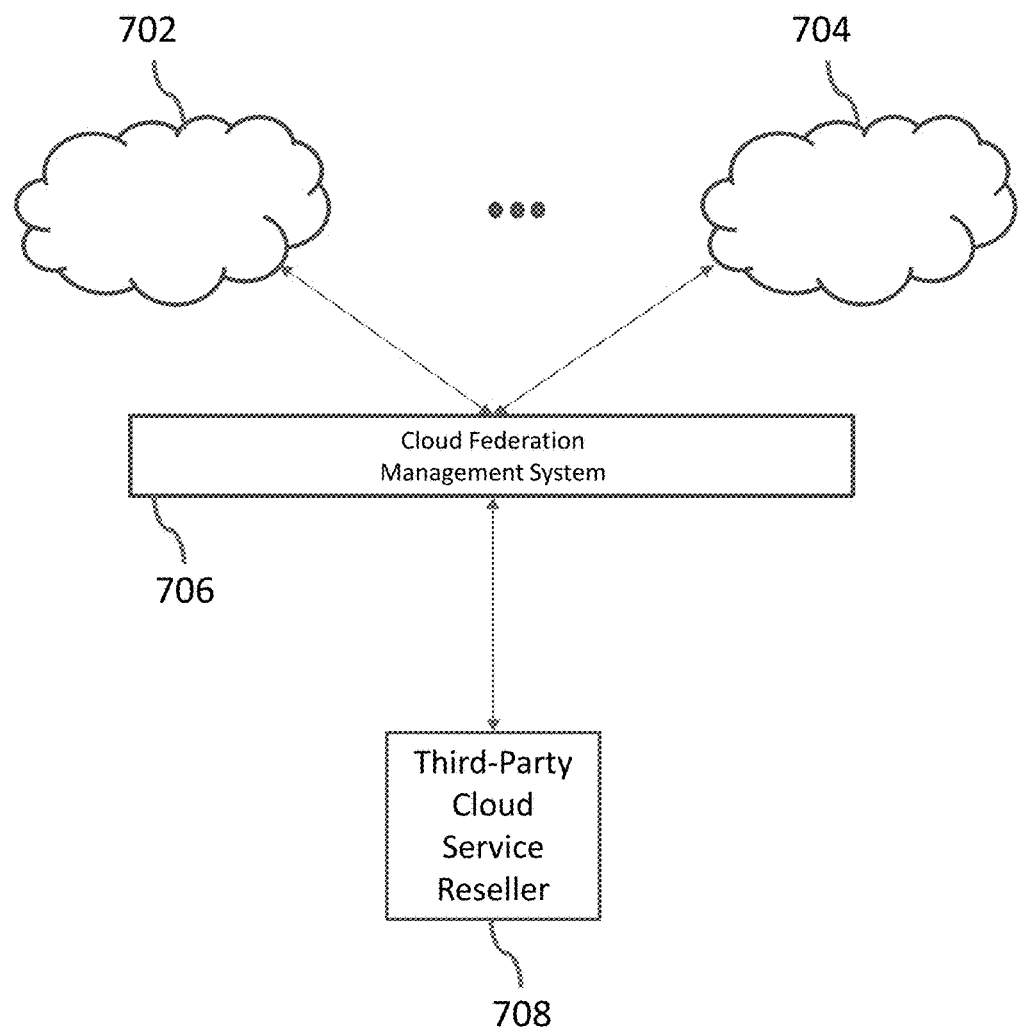
FIG. 7 is a diagram illustrating a cloud federation management system interacting with a third-party cloud service reseller in accordance with another embodiment of the present technology.

FIG. 7 is a diagram illustrating a cloud federation management system interacting with a third-party cloud service reseller in accordance with another embodiment of the present technology. In the illustrated example, a third-party cloud service reseller 708 may connect a cloud federation management system 706. The cloud federation management system 706 may be connected to a cloud computing resource 702 and a cloud computing resource 704. In some embodiments, the third-party cloud service reseller 708 may comprise a portal hosted, controlled and/or owned by an entity different than an entity hosting, controlling and/or owning the cloud federation management system 706. In such example, a third-party cloud service reseller 708 may have established relationship with one or more clients. The one or more clients may connect to a portal of the third-party cloud service reseller 708 to access cloud computing services thereby accessing cloud computing services without having to enter into a relationship with a federation of cloud computing resources managed by the cloud federation management system 706. The third-party cloud service reseller 708 may rely on the cloud federation management system 706 to provide the requested cloud computing services to the one or more clients. In some embodiments, the third-party cloud service reseller 708 may also include a billing module allowing monetization of the cloud computing services used by the one or more clients.

In the embodiment depicted at FIG. 7, the cloud federation management system 706 may be configured to execute a method of managing a federation of cloud computing resources. The method may execute receiving, at the cloud federation management system 705, a request transmitted by a cloud service reseller 708 associated with a user; and causing an identity provider module hosted at a cloud federation management system to establish a connection between a cloud management system associated with a cloud computing resource and an electronic device associated with the user.

In some alternative embodiments, the cloud federation management system 706 may be configured to execute a method of managing a federation of cloud computing resources. The method may execute receiving, at the cloud federation management system 706, a request transmitted by the cloud service reseller 708 associated with a user; causing an identity provider module hosted at the cloud federation management system 706 to establish a connection between a cloud management system associated with a cloud computing resource and an electronic device associated with the user; accessing, by a collector module hosted at the cloud federation management system 706, a data bus hosted at the cloud management system, the data bus being configured so as to monitor an execution of a computing process by the selected cloud computing resource based on a request originating from the user; upon determination, by the collector module, that the execution of the computing process by the selected cloud computing resource based on the request originating from the user has occurred, storing, in a cloud event database, usage data associated with the computer process executed based on the request originating from the user; accessing the cloud event database to generate compiled usage data for the user, the compiled usage data being generated at least based on the usage data; and transmitting, to the cloud service reseller 708, the compiled usage data for the user.

Figure 8:
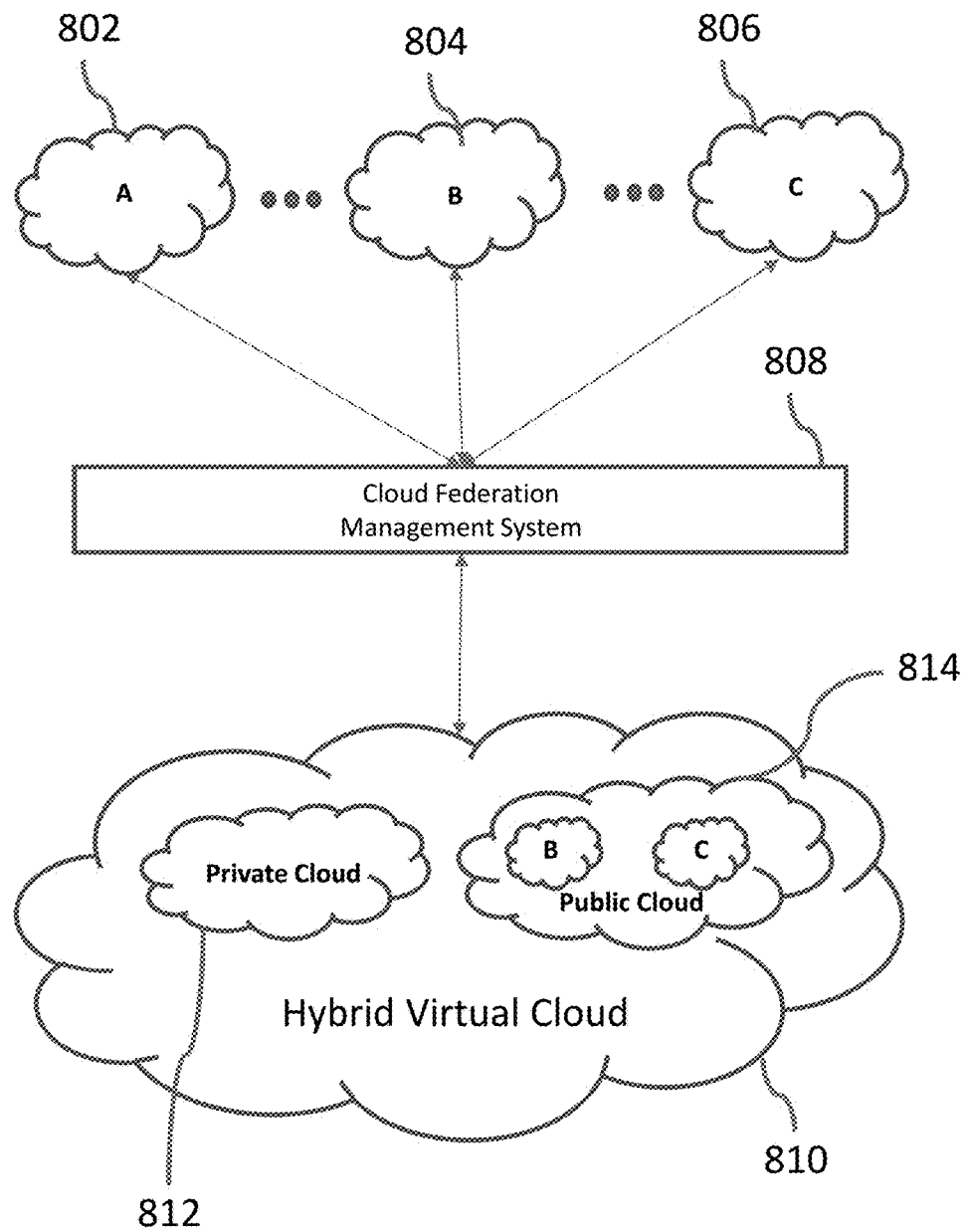
FIG. 8 is a diagram illustrating a cloud federation management system used to generate a hybrid virtual cloud in accordance with another embodiment of the present technology.

FIG. 8 is a diagram illustrating a cloud federation management system used to generate a hybrid virtual cloud in accordance with another embodiment of the present technology. In the illustrated example, a hybrid virtual cloud 810 is created via a cloud federation management system 808. The cloud federation management system 808 includes a cloud computing resource 802, a cloud computing resource 804 and a cloud computing resource 806. In some embodiments, the cloud federation management system 808 may be configured so at to generate the hybrid virtual cloud 810 which may then be relied upon to execute a computing process. The hybrid virtual cloud 810 may rely upon a private cloud 812 (e.g., a cloud owned by a same entity than the entity owning the cloud federation management system and/or an entity owned by a user who has instantiated a creation of the hybrid virtual cloud 810 and/or a cloud which usage may be restricted to predetermined user) and a public cloud 814 (e.g., a cloud which usage may be unrestricted and accessible by any user). In the example illustrated at FIG. 8, the public cloud 814 may rely upon the cloud computing resource 804 and the cloud computing resource 806.

In the embodiment depicted at FIG. 8, the cloud federation management system 808 may be configured to execute a method of generating a hybrid virtual cloud based on a federation of cloud computing resources. The method may execute receiving, by an electronic device, a request to provide a computer process execution platform defining the hybrid virtual cloud; causing an identity provider module hosted at the cloud federation management system 808 to: (i) establish a first connection between a first cloud management system associated with a first cloud computing resource and the electronic device; (ii) establish a second connection between a second cloud management system associated with a second cloud computing resource and the electronic device. The method may also execute establishing the computer process execution platform based on the first connection and the second connection.

In some alternative embodiments, the cloud federation management system 808 may be configured to execute a method of generating a hybrid virtual cloud based on a federation of cloud computing resources. The method may execute receiving, by an electronic device, a request to provide a computer process execution platform defining the hybrid virtual cloud; causing an identity provider module hosted at a cloud federation management system to: (i) establish a first connection between a first cloud management system associated with a first cloud computing resource and the electronic device; and (ii) establish a second connection between a second cloud management system associated with a second cloud computing resource and the electronic device. The method may further include establishing the computer process execution platform based on the first connection and the second connection; accessing, by a collector module hosted at the cloud federation management system, a first data bus hosted at the first cloud management system, the first data bus being configured so as to monitor an execution of a computing process by the first cloud computing resource based on the request, the computing process being partially executed by the first cloud computing resource and partially executed by the second cloud computing resource; accessing, by the collector module hosted at the cloud federation management system, a second data bus hosted at the second cloud management system, the second data bus being configured so as to monitor an execution of the computing process by the second cloud computing resource based on the request; and compiling a first set of data gathered by the collector module from the first data bus and a second set of data gathered by the collector module from the second data bus to generate cloud federation usage data indicative of a usage of the federation of cloud computing resources by the user.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method of managing a federation of cloud computing resources, the method comprising:

causing an identity provider module hosted at a cloud federation management system to establish a first connection between a first cloud management system associated with a first cloud computing resource and an electronic device associated with a user;

accessing, by a collector module hosted at the cloud federation management system, a first data bus hosted at the first cloud management system, wherein the first data bus is configured so as to monitor an execution of a first computing process that is based on a first request originating from the electronic device associated with the user and wherein said execution of said first computing process is performed by said first cloud computing resource;

securing, by the first cloud management system, a first amount of processing power for performing a first phase of said first computing process by said first cloud computing resource and securing, by the first cloud management system, a first amount of storage for storing data associated with said first phase;

securing, by the first cloud management system, an amount of processing power for performing a different phase of said first computing process, said different phase not being said first phase, and securing, by the first cloud management system, an amount of storage for storing data associated with said different phase, said amount of processing power being lesser or greater than said first amount of processing power, said amount of storage being greater than said first amount of storage when said amount of processing power is less than said first amount of processing power;

causing the identity provider module to establish a second connection between a second cloud management system associated with a second cloud computing resource and the electronic device associated with the user;

accessing, by the collector module hosted at the cloud federation management system, a second data bus hosted at the second cloud management system, wherein the second data bus is configured so as to monitor an execution of a second computing process that is based on a second request originating from the electronic device associated with the user and wherein said execution of said second computing process is performed by said second cloud computing resource;

securing, by the second cloud management system, a second amount of processing power for performing a second phase of said second computing process by said second cloud computing resource and securing, by the second cloud management system, a bandwidth of a communication interface for use during said second phase;

securing, by the second cloud management system, a third amount of processing power for performing a third phase of said second computing process and securing, by the second cloud management system, a different bandwidth of a communication interface for use during said third phase, said third amount of processing power being lesser or greater than said second amount of processing power, said different bandwidth being greater than said bandwidth when said third amount of processing power is less than said second amount of processing power; and compiling a first set of data gathered by the collector module from the first data bus and a second set of data gathered by the collector module from the second data bus to generate cloud federation usage data indicative of a usage of the federation of cloud computing resources by the user.

2. The method of claim 1, wherein the first set of data gathered by the collector module from the first data bus comprises data indicative of a creation of the first computing process and data indicative of a deletion of the first computing process.

3. The method of claim 2, wherein the data indicative of the creation of the first computing process and the data indicative of the deletion of the first computing process further comprise a time stamp, a resource identifier associated with the first cloud computing resource and a user identifier associated with at least one of the user and the electronic device.

4. The method of claim 1, wherein prior to causing the identity provider module hosted at the cloud federation management system to establish the first connection, the method executes:

causing the electronic device to display a list of cloud computing resources, the cloud computing resources comprising at least the first cloud computing resource and the second cloud computing resource; and receiving, by the cloud federation management system, an indication of at least one of the cloud computing resources selected by the user.

5. The method of claim 1, wherein prior to causing the identity provider module hosted at the cloud federation management system to establish the first connection, the method executes:

receiving, from the electronic device, an indication that the first computing process is to be executed by the federation of cloud computing resources; and determining, by the cloud federation management system, which one of cloud computing resources is to be selected to execute the first computing process.

6. The method of claim 1, wherein the cloud federation usage data is indicative of a usage of the federation of cloud computing resources by each respective one of a plurality of users.

7. The method of claim 1, wherein the cloud federation usage data is indicative of a usage of the federation of cloud computing resources for a given period of time, the given period of time being associated with at least one of the first computing process and the second computing process.

8. The method of claim 1, further comprising: instantiating the first computing process in the first cloud computing resource; and instantiating the second computing process in the second cloud computing resource.

9. A computer-implemented system for managing a federation of cloud computing resources, the system comprising:

a non-transitory computer-readable medium;

a processor configured to perform:

causing an identity provider module hosted at a cloud federation management system to establish a first connection between a first cloud management system associated with a first cloud computing resource and an electronic device associated with a user;

accessing, by a collector module hosted at the cloud federation management system, a first data bus hosted at the first cloud management system, wherein the first data bus is configured so as to monitor an execution of a first computing process that is based on a first request originating from the electronic device associated with the user and wherein said execution of said first computing process is performed by said first cloud computing resource;

securing, by the first cloud management system, a first amount of processing power for performing a first phase of said first computing process by said first cloud computing resource and securing, by the first cloud management system, a first amount of storage for storing data associated with said first phase;

securing, by the first cloud management system, an amount of processing power for performing a different phase of said first computing process, said different phase not being said first phase, and securing, by the first cloud management system, an amount of storage for storing data associated with said different phase, said amount of processing power being lesser or greater than said first amount of processing power, said amount of storage being greater than said first amount of storage when said amount of processing power is less than said first amount of processing power;

causing the identity provider module hosted at the cloud federation management system to establish a second connection between a second cloud management system associated with a second cloud computing resource and the electronic device associated with the user;

accessing, by the collector module hosted at the cloud federation management system, a second data bus hosted at the second cloud management system, wherein the second data bus is configured so as to monitor an execution of a second computing process that is based on a second request originating from the electronic device associated with the user and wherein said execution of said second computing process is performed by said second cloud computing resource;

securing, by the second cloud management system, a second amount of processing power for performing a second phase of said second computing process by said second cloud computing resource and securing, by the second cloud management system, a bandwidth of a communication interface for use during said second phase;

securing, by the second cloud management system, a third amount of processing power for performing a third phase of said second computing process and securing, by the second cloud management system, a different bandwidth of a communication interface for use during said third phase, said third amount of processing power being lesser or greater than said second amount of processing power, said different bandwidth being greater than said bandwidth when said third amount of processing power is less than said second amount of processing power; and compiling a first set of data gathered by the collector module from the first data bus and a second set of data gathered by the collector module from the second data bus to generate cloud federation usage data indicative of a usage of the federation of cloud computing resources by the user.

10. The system of claim 9, wherein the first set of data gathered by the collector module from the first data bus comprises data indicative of a creation of the first computing process and data indicative of a deletion of the first computing process.

11. The system of claim 10, wherein the data indicative of the creation of the first computing process and the data indicative of the deletion of the first computing process further comprise a time stamp, a resource identifier associated with the first cloud computing resource and a user identifier associated with at least one of the user and the electronic device.

12. The system of claim 9, wherein prior to causing the identity provider module hosted at the cloud federation management system to establish the first connection, the processor is configured to perform:

causing the electronic device to display a list of cloud computing resources, the cloud computing resources comprising at least the first cloud computing resource and the second cloud computing resource; and receiving, by the cloud federation management system, an indication of at least one of the cloud computing resources selected by the user.

13. The system of claim 9, wherein prior to causing the identity provider module hosted at the cloud federation management system to establish the first connection, the processor is configured to perform:

receiving, from the electronic device, an indication that the first computing process is to be executed by the federation of cloud computing resources; and determining, by the cloud federation management system, which one of cloud computing resources is to be selected to execute the first computing process.

14. The system of claim 9, wherein the cloud federation usage data is indicative of a usage of the federation of cloud computing resources for a given period of time, the given period of time being associated with at least one of the first computing process and the second computing process.

15. The system of claim 9, wherein the cloud federation usage data is indicative of at least one of a quantity of storage, an amount of processor usage, a time period, a data volume, a usage of on operating system and a usage of a software.

16. The system of claim 9, wherein the processor is further configured to perform:

instantiating the first computing process in the first cloud computing resource; and instantiating the second computing process in the second cloud computing resource.

17. The system of claim 9, wherein the first cloud management system is associated with a first cloud service provider and the second cloud management system is associated with a second cloud service provider.

18. The system of claim 9, wherein the identity provider module and the collector module are hosted by a backend system of the cloud federation management system, the backend system being distinct from a frontend system hosting a portal server allowing the user to interact with the cloud federation management system.

19. The system of claim 9, wherein prior to causing the identity provider module hosted at the cloud federation management system to establish the first connection, the processor is configured to perform:

receiving, by the cloud federation management system, a request transmitted by a cloud service reseller associated with the user.

20. A computer-implemented system for managing a federation of cloud computing resources, the system comprising:

a non-transitory computer-readable medium;

a processor configured to perform:

causing an electronic device associated with a user to display a list of cloud computing resources, the cloud computing resources comprising at least a first cloud computing resource associated with a first entity and a second cloud computing resource associated with a second entity;

responsive to receiving an indication of a selected cloud computing resource selected from the list of cloud computing resources by the user, causing an identity provider module hosted at a cloud federation management system to establish a connection between a cloud management system associated with the selected cloud computing resource and the electronic device associated with the user;

accessing, by a collector module hosted at the cloud federation management system, a data bus hosted at the cloud management system, wherein the data bus is configured so as to monitor an execution of a computing process that is based on a request originating from the user and wherein said execution of said computing process is performed by said selected cloud computing resource;

securing, by the cloud management system, a first amount of processing power for performing a first phase of the computing process by the selected cloud computing resource and securing, by the cloud management system, a first amount of storage for storing data associated with the first phase;

securing, by the cloud management system, an amount of processing power for performing a different phase of the computing process, the different phase not being the first phase, and securing, by the cloud management system, an amount of storage for storing data associated with the different phase, the amount of processing power being lesser or greater than the first amount of processing power, the amount of storage being greater than the first amount of storage when the amount of processing power is less than the first amount of processing power;

responsive to a determination, by the collector module, that the execution of the computing process that is based on the request originating from the user has occurred, storing, in a cloud event database, usage data associated with the computing process executed based on the request originating from the user; and accessing the cloud event database to generate compiled usage data for the user, the compiled usage data being generated at least based on the usage data.

* * * * *